United States Patent [19]

Brown et al.

[11] Patent Number: 5,189,114
[45] Date of Patent: Feb. 23, 1993

[54] COMPATIBILIZATION OF POLYPHENYLENE ETHER WITH POLYESTER USING POLYSTYRENE-POLYCARBONATE COPOLYMER

[75] Inventors: Sterling B. Brown, Schenectady, N.Y.; Edward J. Fewkes, Jr., Belpre, Ohio

[73] Assignee: General Electric Company, Pittsfield, Mass.

[21] Appl. No.: 636,232

[22] Filed: Dec. 31, 1990

[51] Int. Cl.$^5$ .................... C08F 283/02; C08L 67/03; C08L 69/00; C08L 71/12

[52] U.S. Cl. .................. 525/394; 525/92; 525/146; 525/397; 525/468; 525/905

[58] Field of Search ............ 525/90, 468, 92, 146, 525/394, 397, 905

[56] References Cited

U.S. PATENT DOCUMENTS

| | | | |
|---|---|---|---|
| 4,786,664 | 11/1988 | Yates, III | 524/417 |
| 4,806,297 | 2/1989 | Brown et al. | 525/905 |
| 4,816,510 | 3/1989 | Yates, III | 542/449 |
| 4,831,087 | 5/1989 | Brown | 525/394 |
| 4,845,160 | 7/1989 | Sybert | 525/397 |
| 4,866,130 | 9/1989 | Brown et al. | 525/92 |
| 4,879,346 | 11/1989 | Bopp et al. | 525/146 |
| 4,902,753 | 2/1990 | Brown et al. | 525/394 |
| 4,927,881 | 5/1990 | Brown | 525/92 |
| 5,039,742 | 8/1991 | Brown et al. | 525/394 |
| 5,081,184 | 1/1992 | Brown et al. | 525/394 |

FOREIGN PATENT DOCUMENTS

| | | | |
|---|---|---|---|
| 0338269 | 10/1989 | European Pat. Off. . | |
| 0352486 | 1/1990 | European Pat. Off. . | |
| 48-25076 | 7/1973 | Japan | 525/462 |
| 0027908 | 2/1984 | Japan | 525/468 |
| 1138231 | 5/1989 | Japan | 525/146 |
| 965085 | 7/1964 | United Kingdom | 525/146 |

*Primary Examiner*—James J. Seidleck
*Assistant Examiner*—Thomas Hamilton, III

[57] ABSTRACT

There are disclosed thermoplastic resin compositions with improved impact strength and other physical properties, specifically compatibilized compositions comprising polyphenylene ethers and thermoplastic polyesters, with the compatibilization being effected through the use of polystyrene-polycarbonate copolymer.

18 Claims, No Drawings

COMPATIBILIZATION OF POLYPHENYLENE ETHER WITH POLYESTER USING POLYSTYRENE-POLYCARBONATE COPOLYMER

FIELD OF THE INVENTION

This invention relates to novel thermoplastic resin compositions with improved impact strength and other physical properties. More particularly, it relates to improved compatibilized compositions comprising polyphenylene ethers and thermoplastic polyesters, with the compatibilization being effected through the use of polystyrene-polycarbonate copolymer.

BACKGROUND OF THE INVENTION

The polyphenylene ether resin and the polyester resin components of the present invention are, in general, two thermodynamically immiscible polymers and compatibilizers are usually employed in blends of such resins.

For example, Yates III, U.S. Pat. No. 4,786,664 discloses blends of polyphenylene ether, with or without polystyrene resin, in combination with linear polyesters in a weight ratio of less than 1.2:1 in which a compatibilizer comprised of an aromatic polycarbonate can be used as a compatibilizer. The aromatic polycarbonate can be blended with a polystyrene resin. The compatibilizing agent can also be a polycarbonate-polyester copolymer, a polycarbonate polyester blend, or a polyphenylene ether-polycarbonate copolymer.

Similar compatibilizers for polyphenylene ether-polyester blends are described in Brown et al., U.S. Pat. No. 4,806,297; Yates III, U.S. Pat. No. 4,816,510; Brown, U.S. Pat. No. 4,831,087; Brown et al., U.S. Pat. No. 4,866,130; and Brown, U.S. Pat. No. 4,927,881.

In Sybert, U.S. Pat. No. 4,845,160, there are disclosed polyphenylene ether-polyester blends which are compatibilized by the use of polyphenylene ether/polyester copolymers.

In Bopp et al., U.S. Pat. No. 4,879,346, there are described blends of silicone-polycarbonate block copolymers with a compatibilized alloy of polyphenylene ether resin/polyester resin in which the polyphenylene ether resin and polyester resin are compatibilized through the use of aromatic polycarbonates or rubber-modified impact modifiers.

In Brown et al., U.S. Pat. No. 4,902,753, there are disclosed polyphenylene ether-polyester compositions which are compatibilized with the combination of a polycarbonate bisphenol-A homopolymer and a polycarbonate-polyphenylene ether-polycarbonate block copolymer.

In European published Patent Application No. 0 338 269, there are disclosed compatibilized polyphenylene ether-polyester compositions which are free of polycarbonates, and which comprise less than 800 ppm of nitrogen in the polyphenylene ether, and which are compatibilized through the use of specific polyesters in the claimed compositions, which polyesters are said to eliminate the need for polycarbonates therein.

It has now been discovered that a blend of polyphenylene ether resin and polyester resin can be effectively compatibilized through the use of a copolymer comprised of one or more polycarbonate resins and one or more polystyrene resins. In contrast to the compatibilization of polyphenylene ether-polyester blends of the above-mentioned prior art, the compatibilization effected by the copolymers of the presently claimed invention is independent of the weight ratio of polyphenylene ether to polyester in the blends and is independent of the nitrogen content of the polyphenylene ether utilized in the blends. Preferably, in the present copolymer compatibilizer, the polycarbonate resin is a bisphenol-A resin and the polystyrene resin is homopolystyrene. The compositions of the present invention exhibit superior impact strength and other physical properties, especially as compared to compositions comprising equal amounts of polycarbonates and polystyrene resins as are present in the presently claimed copolymers.

SUMMARY OF THE INVENTION

According to the present invention, there are provided compatibilized polyphenylene ether-polyester composition comprising:

(a) polyphenylene ether resin;
(b) polyester resin; and
(c) a compatibilizer for (a) and (b) comprised of a block copolymer comprised of one or more polycarbonate blocks and one or more polystyrene blends.

Preferably, the polyphenylene ether is present in an amount of about 15–50 parts by weight, and more preferably 20–40 parts by weight; the polyester is present in an amount of about 20–60 parts by weight, and more preferably about 30–50 parts by weight; and the block copolymer is present in an amount of greater than zero up to about 40 parts by weight, and more preferably about 15–30 parts by weight.

In other preferred embodiments, there are provided compatibilized polyphenylene ether-polyester compositions comprising:

(a) polyphenylene ether;
(b) polybutylene terephthalate; and
(c) a compatibilizer for (a) and (b) comprised of a block copolymer of the A-B-A type comprised of a polycarbonate as the B block and a polystyrene as the A block.

Still preferably in the compositions, the polystyrene/polycarbonate copolymer contains approximately a 2.0:1–1:2.0 weight ratio, preferably 1.5:1–1:1.5 weight ratio, and more preferably approximately a 1:1 weight ratio of polystyrene to polycarbonate, and the compositions comprise a weight ratio of polyester to polyphenylene ether within the range of about 4.0–0.5:1, preferably about 3.0–1.0:1, and more preferably about 2.55–1.0:1.

In another preferred embodiment, the compositions may also contain impact modifiers, such as the well-known Kraton G and D impact modifiers, specifically Kraton ® G-1650, -1651, -1652, -1701, -1702, and D-1101 and -1102, and/or similar impact modifiers. When present, the impact modifier preferably is present in an amount of up to about 25 parts by weight, more preferably up to about 15 parts by weight.

In still another preferred embodiment, the compositions may also contain an additional polycarbonate polymer, specific mention being made of bisphenol-A homopolymer, which, in certain applications, confers additional beneficial aspects to the compositions. When present, the additional polycarbonate polymer preferably is present in an amount up to about 20 parts by weight, more preferably up to about 10 parts by weight.

One object of the present invention is to provide compatibilized compositions comprising polyphenylene ether, polyester, and a block copolymer comprised of polycarbonate and polystyrene.

Another object of the present invention is to provide compatibilized compositions comprising polyphenylene ether, polyester, a block copolymer comprised of polystyrene and polycarbonate, with an added impact modifier.

These compositions may optionally contain additional polycarbonate homopolymer, as mentioned above.

The compositions of the present invention which contain a polycarbonate/polystyrene copolymer exhibit improved physical properties as compared to comparison blends which contain equivalent weights, respectively, of polycarbonate and polystyrene polymers.

It is not certain whether any or all of the components in these compositions interact chemically upon blending. Therefore, the invention includes compositions comprising said components and any reaction products thereof, as well as other optional components described hereinafter.

DETAILED DESCRIPTION OF THE INVENTION

The polyphenylene ethers (also known as polyphenylene oxides and PPO ® (a registered trademark of the General Electric Company)) used as component (a) in the present invention comprise a plurality of structural units having the formula:

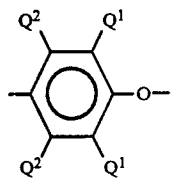
(I)

In each of said units, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary or lower alkyl groups are methyl, ethyl, n-propyl, n-butyl, isobutyl, n-amyl, isoamyl, 2-methylbutyl, n-hexyl, 2,3-dimethylbutyl, 2-,3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with, for example, 2,3,6-trimethyl-1,4-phenylene ether units. Many suitable random copolymers, as well as homopolymers, are also disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in a known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.15–0.6 dl./g., and preferably at least 0.25 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen) and copolyphenylene ethers of 2,6-xylenol and 2,3,6-trimethyl phenol.

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

The polyphenylene ethers which may be used in the invention include those which comprise molecules having at least one of the end groups of the formulae

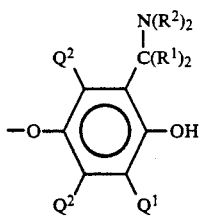

and

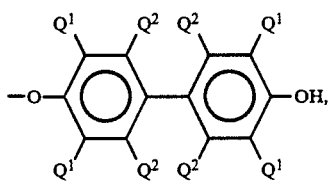

wherein $Q^1$ and $Q^2$ are as previously defined, each $R^1$ is independently hydrogen or alkyl, with the proviso that the total number of carbon atoms in both $R^1$ radicals is 6 or less; and each $R^2$ is independently hydrogen or a $C_{1-6}$ primary alkyl radical. Preferably, each $R^1$ is hydrogen and each $R^2$ is alkyl, especially methyl or n-butyl.

Polymers containing the end groups of formula II (hereinafter "aminoalkyl end groups") may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing of the o-hydrogen atoms on one or more $Q^1$ radicals. The principal site of reaction is the $Q^1$ radical adjacent to the hydroxy group on the terminal unit of the polymer chain. During further processing and/or blending, the aminoalkyl end groups may undergo various reactions, probably involving a quinone methide-type intermediate of the formula

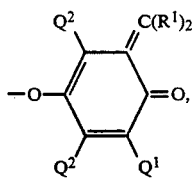

with numerous beneficial effects often including an increase in impact strength and compatibilization with other blend components. Reference is made to U.S. Pat. Nos. 4,054,553, 4,092,294, 4,477,649, 4,477,651 and 4,517,341.

Polymers with 4-hydroxybiphenyl end groups of formula III are typically obtained from reaction mixtures in which a by-product diphenoquinone of the formula

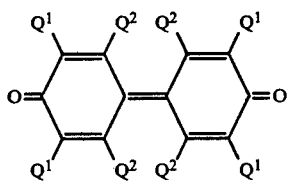

is present, especially in a copper-halide-secondary or tertiary amine system. In this regard, the disclosure of U.S. Pat. No. 4,477,649 is again pertinent as are those of U.S. Pat. Nos. 4,234,706 and 4,482,697. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulae II and III. In particular, polyphenylene ethers originally containing at least about 60% by weight of molecules having aminoalkyl end groups of formula II are contemplated for use in the present invention.

The use of polyphenylene ethers containing substantial amounts of neutralized amino nitrogen is contemplated by the present invention. The amino compounds include, in addition to the aforementioned aminoalkyl end groups, traces of amine (particularly secondary amine) in the catalyst used to form the polyphenylene ether.

Therefore, a substantial proportion of any amino compounds in the polyphenylene ether can be removed or inactivated according to known techniques prior to use in the present compositions, such as described in European published Patent Application No. 0 338 269, as well as other prior art references mentioned in the "Background of the Invention" herein. Polymers so treated are sometimes referred to hereinafter as "inactivated" polyphenylene ethers. They contain unneutralized amino nitrogen, if any, in amounts preferably no greater than 800 ppm. and, more preferably, in the range of about 100-800 ppm. Various methods for inactivation have been developed and are known in the art, and any one or more thereof may be used.

The unneutralized polyphenylene ethers suitable for use in the present compositions can be referred to as "high nitrogen" polyphenylene ether and the neutralized polyphenylene ethers suitable for use in the present compositions can be referred to as "low nitrogen" polyphenylene ethers.

One such method of inactivation to obtain "low nitrogen" polyphenylene ether is to precompound the polyphenylene ether with at least one non-volatile compound containing a carboxylic acid, acid anhydride or ester group, which is capable of neutralizing the amine compounds. This method is of particular interest in the preparation of compositions of this invention having high resistance to heat distortion. Illustrative acids, anhydrides and esters are citric acid, malic acid, agaricic acid, succinic acid, succinic anhydride, maleic acid, maleic anhydride, diethyl maleate, citraconic acid, citraconic anhydride, itaconic acid, itaconic anhydride, fumaric acid, methyl fumarate and pyromellitic dianhydride. Because of their relatively high reactivity with amino compounds, the free carboxylic acids and their anhydrides, especially fumaric acid and pyromellitic dianhydride, are generally most useful.

Reaction of the polyphenylene ether with the acid or anhydride to neutralize the amino groups may be achieved by heating at a temperature within the range of about 230°-390° C., in solution or preferably in the melt. In general, about 0.3-2.0 and preferably about 0.5-1.5, both by weight, of acid or anhydride is employed per 100 parts of polyphenylene ether. The reaction may conveniently be carried out in an extruder or similar equipment.

Another method of inactivation is by extrusion of the polyphenylene ether under the above-described conditions with vacuum venting. This may be achieved either in a preliminary extrusion step, or during extrusion of the composition of this invention, by connecting the vent of the extruder to a vacuum pump capable of creating a pressure of about 200 torr or less.

It is believed that these inactivation methods aid in the removal of any traces of free amines, which are believed to be predominantly secondary amines, in the polymer, including amines generated by conversion of aminoalkyl end groups to quinone methides of the type represented by formula IV. Polyphenylene ethers having a free amine nitrogen content below about 800 ppm. may be particularly useful in certain embodiments of this invention. However, the invention is not dependent on any theory of inactivation.

The chemical role of the inactivated polyphenylene ether in certain of the compositions of this invention is not fully understood, and any reliance on chemical theory is specifically disclaimed. It is believed, however, that the presence of amino compounds in the polyphenylene ether can cause degradation in the molecular weight of the polycarbonate and polyester. Such amino compounds include, in addition to the aminoalkyl end groups, traces of amines (particularly secondary amine) in the catalyst used to form the polyphenylene ether. If this is true, the removal or neutralization of the greater part of such amino compounds produces an environment in which high molecular weight is maintained in the polyester and in the polycarbonate, which may maximize the effect of the polycarbonate in the compatibilizing agent of the present invention.

The polyesters which may be employed as a component in the present compositions are, in general, relatively high in molecular weight, may be branched or linear, and are normally flammable thermoplastic polymers. These include polyesters such as polyethylene terephthalate (PET), polybutylene terephthalate (PBT), polycyclohexane-bis-methylene terephthalate (PCT) and thermoplastic elastomeric polyesters such as General Electric Company's LOMOD ®, DuPont's Hytrel ®, Celanese's Riteflex ® and Toyobo's Pelprene ®, or combinations of these thermoplastic elastomeric polyesters with other above polyesters such as PBT, or combinations with each other. Polyesters suitable for compositions of the present invention include, in general, linear saturated condensation products of diols and dicarboxylic acids, or reactive derivatives thereof. Preferably, they are polymeric glycol esters of terephthalic acid and isophthalic acid. These polymers are available commercially or can be prepared by known techniques, such as by the alcoholysis of esters of the phthalic acid with a glycol and subsequent polymerization, by heating glycols with the free acids or with halide derivatives thereof, and similar processes. Such polymers and methods of their preparation are described further in U.S. Pat. No. 2,465,319 and in U.S. Pat. No. 3,047,539, and elsewhere.

Preferred polyesters are of the family consisting of high molecular weight, polymeric glycol terephthalates or isophthalates having repeating units of the formula

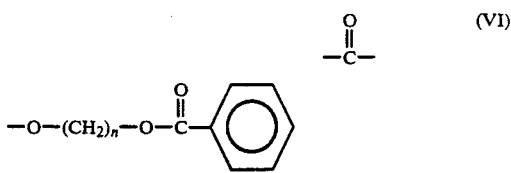

where n is a whole number from two to ten, and more usually from two to four, and mixtures of such esters, including copolyesters of terephthalic and isophthalic acids of up to 30 mol percent isophthalic units.

Especially preferred polyesters are poly(ethylene terephthalate) and poly(1,4-butylene terephthalate).

Especially favored when high melt strength is important are branched high melt viscosity poly(1,4-butylene terephthalate) resins which include small amounts, for example, up to 5 mol percent based on the terephthalate units, of a branching component containing at least three ester forming groups. The branching component can be one which provides branching in the acid unit portion of the polyester, or in the glycol unit portion, or it can be a hybrid. Illustrative of such branching components are tri- or tetracarboxylic acids, such as trimesic acid, pyromellitic acid, and lower alkyl esters thereof, and the like, or preferably, tetrols, such as pentaerythritol, triols, such as trimethylolpropane, or dihydroxy carboxylic acids and hydroxydicarboxylic acids and derivatives, such as dimethyl hydroxyterephthalate, and the like. The addition of a polyepoxide, such as triglycidyl isocyanurate, which is known to increase the viscosity of the polyester phase through branching can aid in improving the physical properties of the present blends.

The branched poly(1,4-butylene terephthalate) resins and their preparation are described in U.S. Pat. No. 3,953,404.

Illustratively, the high molecular weight polyesters useful in the practice of this invention have an intrinsic viscosity of at least about 0.2 deciliters per gram, and more usually from about 0.4 to 1.5 deciliters per gram as measured in solution in ortho-chlorophenol or a 60/40 phenol/tetrachloroethane mixture at 25° to 30° C.

Also useful are copolyesters, such as segmented copolyesters having a multiplicity of recurring etherester and/or ester units as described in U.S. Pat. Nos. 3,651,014; 3,763,109; and 3,766,146. Useful materials are available from DuPont under the trade designation Hytrel ® resins, for example Hytrel ® 4055 and Hytrel ® 5555.

The preferred polyesters contain structural units of the formula

and of at least one of the formulae

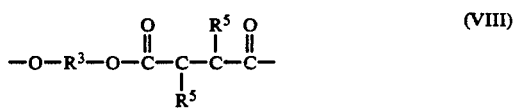

and

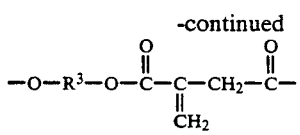

In these formulae, each of $R^3$ and $R^4$ is a divalent aliphatic, alicyclic or aromatic radical containing about 2–10 carbon atoms and each $R^5$ is independently hydrogen or a $C_{1-4}$ primary or secondary alkyl radical, at least one $R^5$ being hydrogen.

Illustrative $R^3$ and $R^4$ radicals are ethylene, propylene, trimethylene, tetramethylene, hexamethylene, decamethylene, 1,4-cyclohexane-bis-methylene, olefinic derivatives of the foregoing, p-phenylene, m-phenylene and bis(4-phenylene)propane. Also included are substituted radicals wherein the substituents do not substantially affect the relevant chemical properties of the radical; illustrative substituents are alkoxy, halo and nitrile. Most often, $R^3$ is an alkylene radical, preferably ethylene or tetramethylene, and $R^4$ is m- or p-phenylene.

In formula VIII, each $R^5$ may be hydrogen or a primary or secondary $C_{1-4}$ alkyl radical such as methyl, ethyl, 1-propyl, 2-propyl, 1-butyl or 2-butyl. At least one $R^5$ value is hydrogen. Among the alkyl radicals, methyl is preferred.

Thus, the radicals of formulae VIII and IX are derived from unsaturated dicarboxylic acids such as maleic, fumaric, citraconic or itaconic acid. Maleic and fumaric acids are preferred by reason of their availability and low cost.

It is also contemplated to employ elastomeric polyesters. Such polyesters are known in the art and are exemplified by compositions in which a portion of the $R^3$ values are soft segment radicals such as polyoxyalkylene (typically polyoxyethylene or polyoxytetramethylene) and units derived from lactones such as ε-caprolactone. Numerous elastomeric polyesters of this type are commercially available, and include those sold by DuPont under the trademark HYTREL® and by General Electric under the trademark LOMOD®.

The polyester may include structural units of the formula

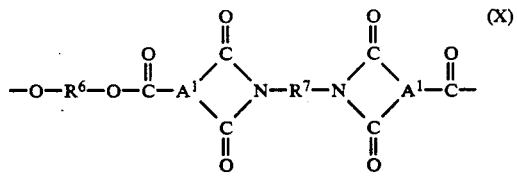

wherein $R^6$ can be selected from radicals such as previously defined for $R^3$ and $R^4$, $R^7$ is a polyoxyalkylene radical and $A^1$ is a trivalent aromatic radical. The $A^1$ radical in formula X is usually derived from trimellitic acid and has the structure

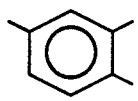

The $R^6$ radical may be, for example, a $C_{2-10}$ alkylene radical, a $C_{6-10}$ alicyclic radical, a $C_{6-20}$ aromatic radical or a polyoxyalkylene radical in which the alkylene groups contain about 2–6 and most often 4 carbon atoms.

Such polyesters may be prepared by the known reaction of dihydroxy compounds with mixtures of dicarboxylic acids or of functional derivatives thereof such as anhydrides, acid chlorides or lower alkyl (especially methyl) esters. The esters are often the preferred reactants.

Polyester preparation is achieved under conventional conditions known in the art. Thus, a diol may be reacted with a mixture of dicarboxylic acid derivatives such as esters. Alternatively, a polyester oligomer may be prepared from the diol and one of the acid derivatives (typically corresponding to formula VII) and an ester of the other acid derivative (typically corresponding to formula VIII and/or IX) added at a later stage in the reaction. The latter ester is preferably a hydroxyalkyl ester of the same diol used in the earlier reaction. Said esterification reactions are typically conducted in the presence of conventional catalysts such as tetraalkyl titanates.

The proportion of units of formula VIII and/or IX in the polyester is not critical and may be adjusted to provide the desired properties. Most often, about 5–20% of the total number of polyester structural units have formula VIII and/or IX, with the balance having formula VII.

The linear polyesters include thermoplastic poly(alkylene dicarboxylates) and alicyclic analogs thereof. They typically comprise structural units of the formula:

wherein $R^8$ is a saturated divalent aliphatic or alicyclic hydrocarbon radical containing about 2 to 10 and usually about 2 to 8 carbon atoms and $A^2$ is a divalent aromatic radical containing about 6 to 20 carbon atoms. They are ordinarily prepared by the reaction of at least one diol such as ethylene glycol, 1,4-butanediol or 1,4-cyclohexanedimethanol with at least one aromatic dicarboxylic acid such as isophthalic or terephthalic acid, or lower alkyl ester thereof. The polyalkylene terephthalates, particularly polyethylene and polybutylene terephthalate and especially the latter, are preferred. Such polyesters are known in the art as illustrated by U.S. Pat. Nos. 2,465,319; 2,720,502; 2,727,881; 2,822,348; 3,047,539; 3,671,487; 3,953,394; and 4,128,526.

The linear polyesters generally have number average molecular weights in the range of about 20,000 to 70,000, as determined by intrinsic viscosity (IV) at 30° C. in a mixture of 60% (by weight) phenol and 40% 1,1,2,2-tetrachloroethane. When resistance to heat distortion is an important factor, the polyester molecular weight should be relatively high, typically above about 40,000.

Because of the tendency of polyesters to undergo hydrolytic degradation at the high extrusion and molding temperatures encountered by the compositions of this invention, it is preferred that the polyester used as component (b) be substantially free of water.

Because of the presence of both polyesters and polymers containing carbonate units in the compositions of this invention, there is a possibility for ester-carbonate exchange resulting in degradation of one or both polymers, particularly at high molding temperatures. It is, therefore, sometimes preferred to incorporate in the compositions an agent which suppresses such exchange, typically in the amount of about 0.01–7.5% by weight of total polyester. It is generally preferred to precompound said exchange-suppressing agent with the polyester, since it is frequently found that the impact strengths of the compositions of this invention are substantially decreased if the exchange suppressing agent is incorporated directly therein. Precompounding may be achieved by direct blending or by forming a concentrate, typically with about 1–25% by weight of total polyester, and adding said concentrate to the remaining portion thereof.

Illustrative exchange suppressing agents are hydroxyaromatic compounds such as the hydroxybenzophenones disclosed in U.S. Pat. No. 4,452,932; salicylate compounds such as methyl salicylate, disclosed in U.S. Pat. No. 4,452,933; and sodium and potassium dihydrogen phosphates disclosed in U.S. Pat. No. 4,532,290.

According to the present invention, the tendency of components (a) and (b) to be incompatible is overcome by incorporating component (c) in the composition. The essential ingredient of component (c) is a copolymer containing blocks of substantial proportion of aromatic polycarbonate units and blocks of polystyrene units. The blocks, independently, may be homopolymeric or copolymeric in nature.

Among the preferred polycarbonates of this type are the aromatic polycarbonate homopolymers. The structural units in such homopolymers generally have the formula

(XII)

wherein $A^3$ is an aromatic radical. Suitable $A^3$ radicals include m-phenylene, p-phenylene, 4,4'-biphenylene, 2,2-bis(4-phenylene)propane, 2,2-bis(3,5-dimethyl-4-phenylene)propane and similar radicals such as those which correspond to the dihydroxyaromatic compounds disclosed by name or formula, generically or specifically, in U.S. Pat. No. 4,217,438. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all $A^3$ radicals are hydrocarbon radicals.

The $A^3$ radicals preferably have the formula

(XIII)

wherein each of $A^4$ and $A^5$ is a single-ring divalent aromatic radical and Y is a bridging radical in which one or two atoms separate $A^4$ from $A^5$. The free valence bonds in formula XIII are usually in the meta or para positions of $A^4$ and $A^5$ in relation to Y. Such $A^3$ values may be considered as being derived from bisphenols of the formula HO—$A^4$—Y—$A^5$—OH. Frequent reference to bisphenols will be made hereinafter, but it should be understood that $A^3$ values derived from suitable compounds other than bisphenols may be employed as appropriate.

In formula XIII, the $A^4$ and $A^5$ values may be unsubstituted phenylene or substituted derivatives thereof, illustrative substituents being one or more alkyl, alkenyl (e.g., crosslinkable-graftable moieties such as vinyl and allyl), halo (especially chloro and/or bromo), nitro, alkoxy and the like. Unsubstituted phenylene radicals are preferred. Both $A^4$ and $A^5$ are preferably p-phenylene, although both may be o- or m-phenylene, or one may be o-phenylene or m-phenylene and the other p-phenylene.

The bridging radical, Y, is one in which one or two atoms, preferably one, separate $A^4$ from $A^5$. It is most often a hydrocarbon radical, and particularly a saturated radical such as methylene, cyclohexylmethylene, 2-[2.2.1]-bicycloheptylmethylene, ethylene, 2,2-propylene, 1,1-(2,2-dimethylpropylene), 1,1-cyclohexylene, 1,1-cyclopentadecylene, 1,1-cyclododecylene or 2,2-adamantylene, especially a gemalkylene radical. Also included, however, are unsaturated radicals and radicals which are entirely or partially composed of atoms other than carbon and hydrogen. Examples of such radicals are 2,2-dichloroethylidene, carbonyl, thio, oxy, and sulfone. For reasons of availability and particular suitability for the purposes of this invention, the preferred radical of formula XII is the 2,2-bis(4-phenylene)propane radical, which is derived from bisphenol-A and in which Y is isopropylidene and $A^4$ and $A^5$ are each p-phenylene.

Various methods of preparing polycarbonate homopolymers are known, and any of them may be used for preparing component (c). They include interfacial and other methods in which phosgene is reacted with bisphenols, transesterification methods in which bisphenols are reacted with diaryl carbonates, and methods involving conversion of cyclic polycarbonate oligomers to linear polycarbonates. The latter method is disclosed in U.S. Pat. Nos. 4,605,731 and 4,644,053.

The weight average molecular weight of the homo or copolycarbonate should be at least about 40,000 (as determined by gel permeation chromatography relative to polystyrene). It is most often in the range of about 40,000–80,000 and especially about 60,000–80,000. However, compositions in which component (c) has a molecular weight in the range of about 80,000–200,000 often have favorable properties.

Component (c) also contains at least one polystyrene resin. The term "polystyrene" as used herein includes polymers prepared by methods known in the art including bulk, suspension and emulsion polymerization, which contain at least 25% by weight of structural units derived from a monomer of the formula:

(XIV)

wherein $R^9$ is hydrogen, lower alkyl or halogen; Z is vinyl, halogen or lower alkyl; and p is from 0 to 5. These resins include homopolymers of styrene, chlorostyrene and vinyltoluene, random copolymers of styrene with one or more monomers ted by acrylonitrile, butadiene, α-methylstyrene, ethylvinylbenzene, divinylbenzene and maleic anhydride, and rubber-modified polystyrenes comprising blends and grafts, wherein the rubber is a polybutadiene or a rubbery copolymer of about 98–70% styrene and about 2–30% diene monomer. These rubber-modified polystyrenes include high impact polystyrene, or HIPS. Preferred is polystyrene homopolymer.

Typically, the compositions of the present invention may also contain at least one elastomeric polyphenylene ether-compatible impact modifier. Suitable impact modifiers include various elastomeric copolymers, of which examples are ethylene-propylene-diene polymers (EPDM's), both unfunctionalized and functionalized with, for example, sulfonate or phosphonate groups; carboxylated ethylenepropylene rubbers; block copolymers of alkenylaromatic compounds such as styrene with polymerizable olefins or dienes, including butadiene, isoprene, chloroprene, ethylene, propylene and butylene; and core-shell elastomers containing, for example, a poly(alkyl acrylate) core attached to a polystyrene shell via an interpenetrating network.

The preferred impact modifiers are block (typically diblock, triblock or radial teleblock) copolymers of alkenylaromatic compounds and dienes. Most often, at least one block is derived from styrene and at least one other block from at least one of butadiene and isoprene. Especially preferred are the triblock copolymers with polystyrene end blocks and diene-derived midblocks. It is frequently advantageous to decrease or, preferably, remove, the aliphatic unsaturation therein by selective hydrogenation. The weight average molecular weights of the impact modifiers are typically in the range of about 50,000–300,000. Block copolymers of this type are commercially available from Shell Chemical Company under the trademark KRATON®, and include KRATON® D1101, D1102, G1650, G1651, G1652, G1657, G1701 and G1702. Polyoctenamers, such as Vestenamer 8012 available from Huls AG, can also be used as an impact modifier.

It is also possible to effect dual phase impact modification in the presently claimed compositions through the use of one or more polyphenylene ether impact modifiers, and one or more polyester impact modifiers such as the various grades of KM core-shell impact modifiers available from Rohm and Haas.

It is within the scope of the invention for the composition to contain other conventional ingredients such as fillers, reinforcing materials (e.g. glass fibers), flame retardants, pigments, dyes, stabilizers, anti-static agents, mold release agents and the like. Also included are processability modifiers for component (a), such as olefin copolymers. In general, the amounts of any other resinous components, if present, will not exceed about 15% by weight of total resin.

The preparation of the compositions of this invention is normally achieved by merely blending the ingredients thereof under conditions adapted for the formation of an intimate blend. Such conditions often include extrusion, which may be conveniently effected in a screw-type or similar extruder which applies a substantial shearing force to the composition, thereby decreasing the particle size thereof. The extrusion temperature is generally in the range of about 100°–325° C.

DESCRIPTION OF THE PREFERRED EMBODIMENTS

The polyphenylene ether (PPO®) powder which was utilized in the following Examples was obtained from General Electric Noryl Products, Selkirk, N.Y. and had an intrinsic viscosity of about 0.40 dl./g. and contained approximately 1000 ppm nitrogen by Kjeldahl analysis. The impact modifier which was utilized in the following Examples was Kraton® G1651 obtained from Shell Chemical Company.

The polybutylene terephthalate (PBT) which was utilized in the following Examples was Valox® 315 obtained from General Electric Plastics, Mt. Vernon, Ind. The bisphenol-A (BPA) polycarbonate which was utilized in the following Examples was Lexan® 141 obtained from General Electric Plastics, Mt. Vernon, Ind. PPO vacuum-vented (v.v.) extrudate containing approximately 450 ppm nitrogen which was utilized in the following Examples was prepared in a prior extrusion of the PPO powder with vacuum venting at ≧30 in. (gauge reading) on a 28 mm. extruder at 400 rpm and set temperatures of 250° (throat), 500°, 610°, 610°, and 610° F. The polystyrene (PS) which was utilized in the following Examples was Lustrex® obtained from Monsanto Chemical Co.

The polycarbonate-polystyrene (PC-PS) copolymers which were utilized in the following Examples were prepared by polymerization of styrene monomer initiated by t-butylpermaleate-terminated polycarbonate (PMA-PC) prepared as described in copending application Ser. No. 07/615,192, filed Nov. 19, 1990, now abandoned. The polymerization of styrene monomer by PMA-PC was accomplished by the dissolution of 50.0 g. of PMA-PC ($M_w$=43,000) in 50 ml. of m-dichlorobenzene at 100° C. The addition was then made of 200 ml. of styrene monomer (Aldrich Chem. Co., used without further purification) and the reaction heated to 150° C. for 4 hours. The polymer-containing solution was then isolated by anti-solvent precipitation into methanol. The copolymer was dried overnight at 100° C. in a vacuum oven. The polymer was analyzed by GPC ($M_w$=115,000) and polystyrene chain lengths determined by base cleavage of the polycarbonate, followed by GPC analysis. The PC-PS copolymer obtained was an A-B-A type block copolymer (PS-PC-PS) which was approximately 1:1 PC:PS by weight and contained approximately 40% polystyrene homopolymer.

All blends were prepared by mixing the components on a jar mill followed by extrusion on a Welding Engineers 20 mm. counter-rotating, non-intermeshing, twin-screw extruder at 400 rpm and barrel segment set temperatures of 250° (throat), 375°, 510°, 510°, 510°, and 510° F. Extrudates were quenched in water, pelletized, and dried in a circulating air oven at 100°–110° C. before molding on a Boy 15-ton molder at mold barrel set temperatures of 280° C., mold temperature 80° C., and mold cycle time 13 seconds. Delamination in molded test parts was determined by subjective examination as well as by examination of the load-extension curves generated during tensile measurements. Notched Izod impact values were determined as per ASTM #D256. Tensile properties were determined as per ASTM #D638.

TABLE 1

EXAMPLES 1-3 AND COMPARISON EXAMPLES A-C
(All Numbers are Parts by Weight)

| Example # | PPO | PBT | Kraton | PS-PC Copolymer | PC | PS |
|---|---|---|---|---|---|---|
| A | v.v./20 | 51 | 14 | — | 8 | 7 |
| 1 | v.v./20 | 51 | 14 | 15 | — | — |
| B | v.v./35 | 35 | 14 | — | 8 | 7 |
| 2 | v.v./35 | 35 | 14 | 15 | — | — |
| C | v.v./31 | 31 | 13 | — | 13 | 12 |
| 3 | v.v./31 | 31 | 13 | 25 | — | — |

TABLE 2

PHYSICAL PROPERTIES

| Example # | N.I. (ft.-lb/in.) | Tens. Yield (psi) | Tens. at Break (psi) | Elong. | Comments |
|---|---|---|---|---|---|
| A | 4.1 | 6028 | 5364 | 215% | Ductile |
| 1 | 17.1 | 5914 | 5799 | 263% | Ductile |
| B | 2.7 | 7145 | 5993 | 69% | Ductile |
| 2 | 8.6[a] | 7157 | 6057 | 72% | Ductile |
| C | 1.2 | 7631 | 6291 | 58% | Ductile |
| 3 | 12.5 | 7479 | 6381 | 89% | Ductile |

[a] of either test bars, four had N.I.=11.5–12.2 and four had N.I.=5.1–6.2

Examples 1–3 and Comparison Examples A–C show that there is a dramatic improvement in molded part notched Izod impact strength and consistent improvement in tensile properties in blends containing PS-PC copolymer compared to blends containing equivalents amounts of PS and PC homopolymers. In these blends the ratio of PBT to PPO ranged from 2.55–1.0:1 and the amount of copolymer in the blend ranged from 15 to 25 parts. The blends contained "low nitrogen" vacuum vented PPO extrudate which is believed to permit the use of less PC in PPO/PBT blends for compatilization.

TABLE 3

EXAMPLES 4–6 AND COMPARISON EXAMPLES D–F
(All Numbers are Parts by Weight)

| Example # | PPO | PBT | Kraton | PS-PC Copolymer | PC | PS |
|---|---|---|---|---|---|---|
| D | powder/20 | 51 | 14 | — | 8 | 7 |
| 4 | powder/20 | 51 | 14 | 15 | — | — |
| E | powder/31 | 31 | 13 | — | 13 | 12 |
| 5 | powder/31 | 31 | 13 | 25 | — | — |
| F | powder/36 | 36 | — | — | 15 | 14 |
| 6 | powder/36 | 36 | — | 29 | — | — |

TABLE 4

PHYSICAL PROPERTIES

| Example # | N.I. (ft.-lb/in.) | Tens. Yield (psi) | Tens. at Break (psi) | Elong. | Comments |
|---|---|---|---|---|---|
| D | 1.0 | 5888 | 4734 | 198% | Slight Delamination |
| 4 | 4.5 | 6080 | 5904 | 313% | Slight Delamination |
| E | 0.5 | 7399 | 5965 | 59% | Ductile |
| 5 | 11.5 | 7276 | 6246 | 103% | Ductile |
| F | 0.2 | — | 6420 | 26% | Slight Delamination |
| 6 | 0.2 | — | 4542 | 118% | Slight Delamination |

Examples 4–6 and Comparison Examples D–F contain "high nitrogen" PPO powder. The data again show that there is a dramatic improvement in molded part notched Izod impact strength and a significant improvement in tensile properties in Examples 4 and 5, containing PS-PC copolymer, compared to Comparison Examples D and E containing equivalent amounts of PS and PC homopolymers. The improvement in overall mechanical properties for the PPO powder blends compared to the appropriate controls is similar to that for the blends containing vacuum vented PPO extrudate in TABLES 1 and 2.

Example 6 and Comparison Example F show the effect of PS-PC copolymer versus a mixture of PS and PC homopolymers in PPO/PBT blends without impact modifier. Although both blends showed some signs of delamination, the copolymer-containing blend of Example 6 showed significantly improved tensile elongation compared to Comparison Example F.

TABLE 5

EXAMPLE 7 AND COMPARISON EXAMPLE G

| Example # | PPO | PBT | Kraton | PS-PC Copolymer | PC | PS |
|---|---|---|---|---|---|---|
| G | v.v./36 | 36 | — | — | 15 | 14 |
| 7 | v.v./36 | 36 | — | 29 | — | — |

TABLE 6

PHYSICAL PROPERTIES

| Example # | N.I. (ft.-lb/in.) | Tens. Yield (psi) | Tens. at Break (psi) | Elong. | Comments |
|---|---|---|---|---|---|
| G | 0.2 | 9701 | 7176 | 47% | Ductile |
| 7 | 0.3 | 10370 | 7592 | 60% | Ductile |

Example 7 and Comparison Example G are the same as Example 6 and Comparison Example F, respectively, except that they contain vacuum vented PPO extrudate instead of PPO powder. No delamination was observed in Example 7 or Comparison Example G, and again the blend containing PS-PC copolymer had significantly improved mechanical properties compared to the comparison blend.

TABLE 7

EXAMPLE 8 AND COMPARISON EXAMPLE H

| Example # | PPO | PBT | Kraton | PS-PC Copolymer | PC | PS |
|---|---|---|---|---|---|---|
| H | v.v./29 | 29 | 12 | — | 19 | 11 |
| 8 | v.v./29 | 29 | 12 | 23 | 7 | — |

TABLE 8

PHYSICAL PROPERTIES

| Example # | N.I. (ft.-lb/in.) | Tens. Yield (psi) | Tens. at Break (psi) | Elong. | Comments |
|---|---|---|---|---|---|
| H | 1.7 | 7337 | 6149 | 80% | Ductile |
| 8 | 11.7 | 7715 | 6486 | 74% | Ductile |

Example 8 shows that PC homopolymer can be added to PS-PC copolymer-containing blends with little change in measured mechanical properties. Example 8 again has significantly improved mechanical properties compared to Comparison Example H containing equivalent amounts of PS and PC homopolymers.

All of the patents and applications mentioned in the foregoing Specification are incorporated by reference herein and made a part hereof.

What is claimed is:

1. A compatibilized polyphenylene ether-polyester composition comprising:
   (a) polyphenylene ether resin;
   (b) polyester resin; and
   (c) a compatibilizer for (a) and (b) comprised of a block copolymer comprised of one or more polycarbonate blocks and one or more polystyrene blocks.

2. A composition according to claim 1 wherein the polyphenylene ether is present in an amount of about 15–50 parts by weight, the polyester is present in an amount of about 20–60 parts by weight, and the block copolymer is present in an amount of greater than zero up to about 40 parts by weight.

3. A composition according to claim 2 wherein the polyphenylene ether is present in an amount of about 20-40 parts by weight, the polyester is present in an amount of about 30-50 parts by weight, and the block copolymer is present in an amount of about 15-30 parts by weight.

4. A composition according to claim 1 wherein the weight ratio of polyester to polyphenylene ether is in the range of about 4.0-0.5:1 and the block copolymer contains about a 2.0:1-1:2.0 weight ratio of polycarbonate to polystyrene.

5. A composition according to claim 4 wherein the weight ratio of polyester to polyphenylene ether is about 3.0-1.0:1 and the block copolymer contains a weight ratio of about 1.5:1-1:1.5 of polycarbonate to polystyrene.

6. A composition according to claim 5 wherein the weight ratio of polyester to polyphenylene ether is about 2.55-1.0:1 and the block copolymer contains a weight ratio of polycarbonate to polystyrene of approximately 1:1.

7. A composition according to claim 1 wherein said polyphenylene ether resin is unneutralized.

8. A compatibilized polyphenylene ether polyester composition comprising:
   (a) polyphenylene ether;
   (b) polybutylene terephthalate; and
   (c) a block copolymer of the A-B-A type comprised of a polycarbonate as the B block and a polystyrene as the A block.

9. A composition according to claim 8 wherein the polyphenylene ether is present in an amount of about 15-50 parts by weight, the polyester is present in an amount of about 20-60 parts by weight, and the block copolymer is present in an amount of greater than zero up to about 40 parts by weight.

10. A composition according to claim 9 wherein the polyphenylene ether is present in an amount of about 20-40 parts by weight, the polyester is present in an amount of about 30-50 parts by weight, and the block copolymer is present in an amount of about 15-30 parts by weight.

11. A composition according to claim 8 wherein the weight ratio of polyester to polyphenylene ether is in the range of about 4.0-0.5:1 and the block copolymer contains about a 2.0:1-1:2.0 weight ratio of polycarbonate to polystyrene.

12. A composition according to claim 11 wherein the weight ratio of polyester to polyphenylene ether is about 3.0-1.0:1 and the block copolymer contains a weight ratio of about 1.5:1-1:1.5 of polycarbonate to polystyrene.

13. A composition according to claim 12 wherein the weight ratio of polyester to polyphenylene ether is about 2.55-1.0:1 and the block copolymer contains a weight ratio of polycarbonate to polystyrene of approximately 1:1.

14. A composition according to claim 8 wherein said polyphenylene ether resin is unneutralized.

15. A compatibilized polyphenylene ether-polyester composition consisting essentially of:
   (a) polyphenylene ether resin;
   (b) polyester resin; and
   (c) a compatibilizer for (a) and (b) comprised of a block copolymer comprised of one or more polycarbonate blocks and one or more polystyrene blocks.

16. A compatibilized polyphenylene ether-polyester composition consisting of:
   (a) polyphenylene ether resin;
   (b) polyester resin; and
   (c) a compatibilizer for (a) and (b) comprised of a block copolymer comprised of one or more polycarbonate blocks and one or more polystyrene blocks.

17. A compatibilized polyphenylene ether polyester composition consisting essentially of:
   (a) polyphenylene ether;
   (b) polybutylene terephthalate; and
   (c) a block copolymer of the A-B-A type comprised of a polycarbonate as the B block and a polystyrene as the A block.

18. A compatibilized polyphenylene ether polyester composition consisting of:
   (a) polyphenylene ether;
   (b) polybutylene terephthalate; and
   (c) a block copolymer of the A-B-A type comprised of a polycarbonate as the B block and a polystyrene as the A block.

* * * * *